United States Patent
Ikeda et al.

(10) Patent No.: US 8,743,379 B2
(45) Date of Patent: Jun. 3, 2014

(54) DEVICE FOR MONITORING THICKNESS REDUCTION OF INNER SURFACE IN HEAT TRANSFER TUBE OR INNER SURFACE IN EVAPORATION TUBE

(75) Inventors: Tetsuya Ikeda, Tokyo (JP); Seiji Kagawa, Tokyo (JP); Susumu Okino, Tokyo (JP); Takuya Okamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/877,135

(22) PCT Filed: Sep. 29, 2011

(86) PCT No.: PCT/JP2011/072319
§ 371 (c)(1),
(2), (4) Date: Mar. 29, 2013

(87) PCT Pub. No.: WO2012/046611
PCT Pub. Date: Apr. 12, 2012

(65) Prior Publication Data
US 2013/0182265 A1    Jul. 18, 2013

(30) Foreign Application Priority Data
Oct. 4, 2010 (JP) .................. 2010-225272

(51) Int. Cl.
*G01B 11/28* (2006.01)
(52) U.S. Cl.
USPC ....................................... 356/630
(58) Field of Classification Search
CPC ................................... G01B 11/28

USPC ..................... 356/630; 250/559.27
See application file for complete search history.

(56) References Cited

U.S. PATENT DOCUMENTS

| 4,199,258 A | * | 4/1980 | Dau ........................... 356/626 |
| 4,798,002 A | * | 1/1989 | Salzer et al. .................. 33/707 |
| 4,967,092 A | * | 10/1990 | Fraignier et al. ......... 250/559.07 |
| 5,362,962 A | * | 11/1994 | Barborak et al. ............ 250/234 |

(Continued)

FOREIGN PATENT DOCUMENTS

| JP | 63-55441 A | 3/1988 |
| JP | 64-038649 A | 2/1989 |

(Continued)

OTHER PUBLICATIONS

International Search Report of PCT/JP2011/072319, date of mailing Nov. 1, 2011 (3 pages).

*Primary Examiner* — Roy Punnoose
(74) *Attorney, Agent, or Firm* — Westerman, Hattori, Daniels & Adrian, LLP

(57) ABSTRACT

There is provided a device for monitoring a thickness reduction of an inner surface in a heat transfer tube or an inner surface in an evaporation tube, the device including: a movement unit which moves along a fin tube; a laser measurement unit which is provided in the movement unit and measures the thickness reduction of the inner surface by a laser; a cable which includes a light guiding path for introducing a laser into the laser measurement unit and a light deriving path for transmitting reflected light; and a thickness reduction determining unit which compares the laser measurement data with past data or standard data and determines the current thickness reduction.

3 Claims, 3 Drawing Sheets

(56) References Cited

U.S. PATENT DOCUMENTS

| | | | |
|---|---|---|---|
| 5,760,413 A * | 6/1998 | Kurachi et al. | 250/559.28 |
| 6,931,149 B2 * | 8/2005 | Hagene et al. | 382/141 |
| 7,369,255 B2 * | 5/2008 | Konermann et al. | 356/630 |
| 7,612,878 B2 * | 11/2009 | Frey | 356/241.1 |
| 8,345,094 B2 * | 1/2013 | Demers et al. | 348/84 |
| 2004/0021858 A1 * | 2/2004 | Shima et al. | 356/241.1 |
| 2011/0279828 A1 * | 11/2011 | Matsumoto et al. | 356/630 |

FOREIGN PATENT DOCUMENTS

| | | |
|---|---|---|
| JP | 04-264256 A | 9/1992 |
| JP | 7-29405 U | 6/1995 |
| JP | 7-286828 A | 10/1995 |
| JP | 8-94325 A | 4/1996 |
| JP | 10-332646 A | 12/1998 |
| JP | 2005-181139 A | 7/2005 |
| JP | 2009-204604 A | 9/2009 |

\* cited by examiner

DEVICE FOR MONITORING THICKNESS REDUCTION OF INNER SURFACE IN HEAT TRANSFER TUBE OR INNER SURFACE IN EVAPORATION TUBE

FIELD

The present invention relates to a device for monitoring a thickness reduction of an inner surface in a heat transfer tube or an inner surface in an evaporation tube capable of simply monitoring a thickness reduction of a heat transfer tube or an evaporation tube.

BACKGROUND

When an operation in a heat transfer tube of a heat exchanger or an evaporation tube of a boiler facility or the like is performed for a long period of time, a change in the diameter of the tube occurs.

(1) For example, since an evaporation tube for a land boiler is exposed to a reduction atmosphere so as to suppress NOx in a flue gas in a combustion atmosphere, a problem arises in that corrosion occurs due to the adhering of sulfide.

(2) Further, for example, in a heat exchanger for desulfurization equipment, a problem arises in that corrosion occurs due to the adhering of sulfide produced in a desulfurization process to a heat transfer tube.

(3) For example, in the heat transfer tube of the heat exchanger, a problem arises in that a thickness reduction occurs in the inner diameter due to the abrasion of water when the heat transfer tube is used for a long period of time.

For this reason, a related art has proposed a configuration in which corrosion is inspected by an ultrasonic sensor or a flaw detecting sensor using a high-frequency eddy current (see Patent Literatures 1 to 3).

CITATION LIST

Patent Literature

Patent Literature 1: Japanese Patent Application Laid-open No. 2005-181139
Patent Literature 2: Japanese Patent Application Laid-open No. 64-38649
Patent Literature 3: Japanese Patent Application Laid-open No. 4-264256

SUMMARY

Technical Problem

However, the proposal in Patent Literature has the following problems.

In the proposal of Patent Literatures 1 and 2, the information on the defect or the corrosion of the tube member may be obtained, but a problem arises in which the surface position information may not be easily acquired.

Further, a sensor unit needs to be essentially pressure-bonded to a wall surface for each measurement.

Further, a problem arises in that it is not possible to recognize a change in the surface position for the thickness reduction caused by the abrasion of the circulated cooling water as in the inside of the heat exchanger.

In the proposal of Patent Literature 3, the information on the defect or the corrosion in the tube member may not be obtained, but a problem arises in that the surface position information may not be recognized due to the distribution of the eddy current on the entire surface of the inner wall.

Further, a problem arises in that it is not possible to recognize the acquisition of a change in the surface position for the thickness reduction caused by the abrasion of the circulated cooling water as in the inside of the heat exchanger.

Therefore, there has been a demand for a monitoring device capable of recognizing acquisition of a change in the surface position for the thickness reduction caused by the abrasion of the circulated cooling water as in the inside of the heat exchanger.

The invention is made in view of the above-described problems, and it is an object of the invention to provide a device for monitoring a thickness reduction of an inner surface in a heat transfer tube or an inner surface in an evaporation tube capable of recognizing acquisition of a change in the surface position for a thickness reduction caused by abrasion or the like of an inner surface of a tube.

Solution to Problem

According to a first aspect of the present invention in order to solve the above problems, there is provided a device for monitoring a thickness reduction of an inner surface in a heat transfer tube or an inner surface in an evaporation tube including: a movement unit which moves along the inner surface in the heat transfer tube or the inner surface in the evaporation tube; a laser measurement unit which is provided in the movement unit and measures the thickness reduction of the inner surface in the heat transfer tube or the inner surface in the evaporation tube by a laser; a cable which includes a light guiding path for introducing a laser into the laser measurement unit and a light deriving path for transmitting reflected light; and a thickness reduction determining unit which compares data of the laser measurement unit with past data or standard data and determines the current thickness reduction.

According to a second aspect of the present invention, there is provided the device for monitoring the thickness reduction of the inner surface in the heat transfer tube or the inner surface in the evaporation tube according to the first aspect, further including: a stopping unit which temporarily stops the movement unit.

According to a third aspect of the present invention, there is provided the device for monitoring the thickness reduction of the inner surface in the heat transfer tube or the inner surface in the evaporation tube according to the first or second aspect, wherein the laser measurement unit measures the thickness reduction while sequentially moving along an inner surface of a fin tube by the movement of the movement unit.

Advantageous Effects of Invention

According to the invention, it is possible to evaluate the corrosion and the thickness reduction of the fin tube without disassembling or opening, for example, the equipment of the boiler facility by the movement along the inner surface of the fin tube.

DESCRIPTION OF EMBODIMENTS

Figure 1:
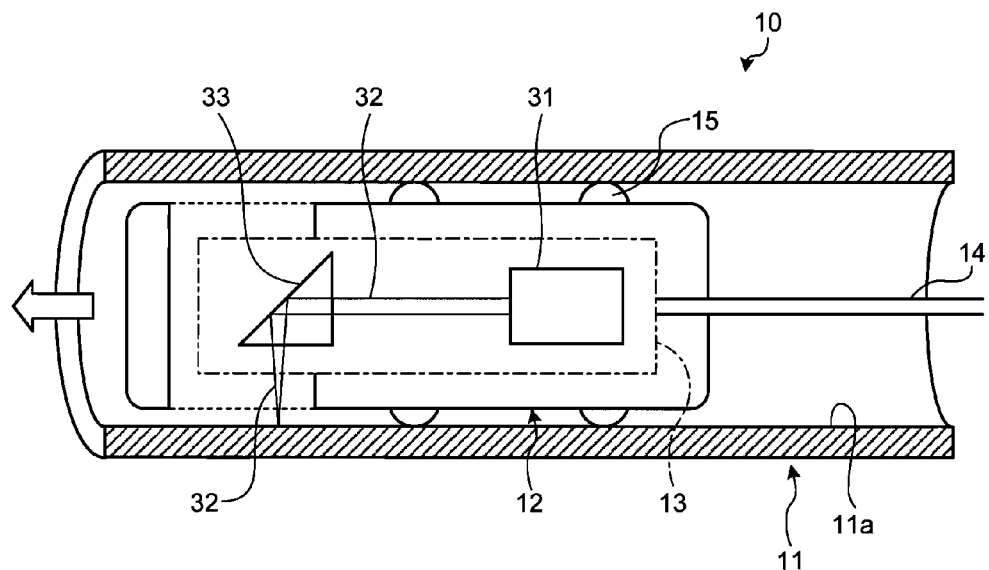
FIG. 1 is a schematic diagram of a device for monitoring a thickness reduction of an inner surface in a heat transfer tube or an inner surface in an evaporation tube.

Hereinafter, the invention will be described in detail by referring to the drawings. Furthermore, the invention is not limited to the embodiment. Further, the constituents described in the embodiment below include a constituent that may be easily supposed by the person skilled in the art and a constituent that substantially has the same configuration.

First Embodiment

A device for monitoring a thickness reduction of an inner surface in a heat transfer tube or an inner surface in an evaporation tube according to a first embodiment of the invention will be described by referring to the drawings. FIG. 1 is a schematic diagram of a device for monitoring a thickness reduction of an inner surface in a heat transfer tube or an inner surface in an evaporation tube.

As illustrated in FIG. 1, a device 10 for monitoring a thickness reduction of an inner surface in a heat transfer tube or an inner surface in an evaporation tube is a device which monitors a thickness reduction of an inner surface in a heat transfer tube or an inner surface in an evaporation tube, and includes a movement unit 12 which moves along a fin tube 11 of the inner surface in the heat transfer tube or the inner surface in the evaporation tube, a laser measurement unit 13 which is provided in the movement unit 12 and measures the thickness reduction of the surface of the heat transfer tube or the evaporation tube by a laser, a cable 14 which includes a light guiding path for introducing a laser to the laser measurement unit 13 and a light deriving path for transmitting reflected light, and a thickness reduction determining unit which compares data of the laser measurement unit 13 with past data or standard data and determines a current thickness reduction.

In the drawings, a moving vehicle wheel 15 is illustrated.

Figure 5:
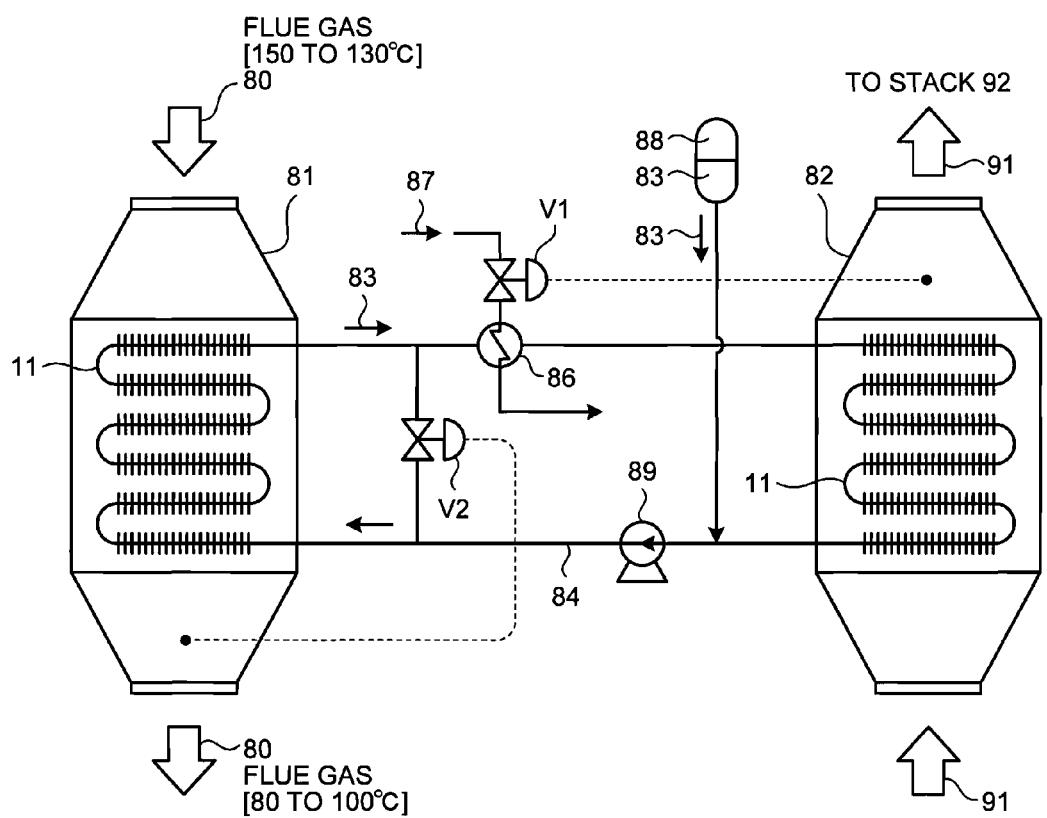
FIG. 5 is a schematic diagram of a heat exchanger of a flue gas treatment facility.

FIG. 5 is a schematic diagram of a heat exchanger of a flue gas treatment facility.

As illustrated in FIG. 5, a heat exchanger is provided into which a flue gas 80 is introduced so as to exchange heat with a heat medium 83.

The heat exchanger includes a heat medium circulation passageway 84 which causes the heat medium 83 to circulate in a heat recovery unit 81 and the reheater 82. The heat medium 83 circulates between the heat recovery unit 81 and the reheater 82 through the heat medium circulation passageway 84. In the surface of the heat medium circulation passageway 84 which is provided inside each of the heat recovery unit 81 and the reheater 82, a plurality of fins are provided on the fin tube 11. The heat medium circulation passageway 84 is provided with a heat exchanging portion 86 and the heat medium 83 exchanges heat with steam 87, so that the medium temperature of the heat medium 83 may be adjusted.

The heat medium 83 is supplied from a heat medium tank 88 to the heat medium circulation passageway 84. The heat medium 83 circulates inside the heat medium circulation passageway 84 by a heat medium feeding pump 89. Further, the supply amount of the steam 87 is adjusted by an adjusting valve V1 in response to the gas temperature of a purging gas 91, the heat medium 83 fed to the reheater 82 is supplied to the heat recovery unit 81 by an adjusting valve V2 in response to the gas temperature of the flue gas 80 discharged from the heat recovery unit 81, and the supply amount of the heat medium 83 supplied to the reheater 82 is adjusted. Furthermore, the purging gas 91 discharged from the reheater 82 is discharged to the outside from a stack 92.

In the embodiment, a thickness reduction of an inner surface 11a of the fin tube 11 is monitored by the device 10 for monitoring the thickness reduction of the inner surface in the heat transfer tube or the evaporation tube.

Here, the laser measurement unit 13 includes a sensor head 31 which includes a laser displacement sensor and a prism 33 which shortens a focal distance of a laser 32 in the device 10 for monitoring the thickness reduction of the inner surface in the heat transfer tube or the inner surface in the evaporation tube illustrated in FIG. 1, and the focal distance of the laser 32 generated by the laser displacement sensor is shortened by the prism 33.

Figure 2:
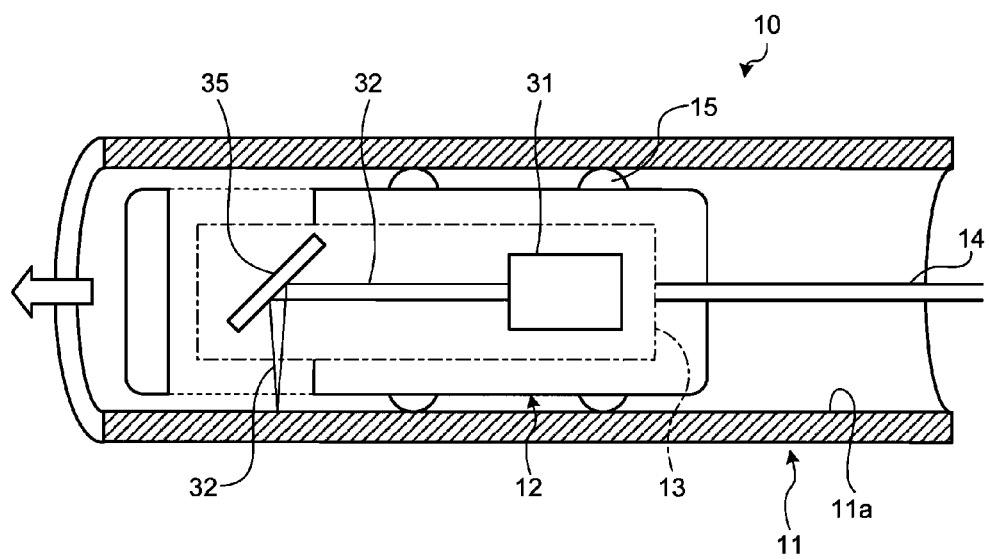
FIG. 2 is another schematic diagram of a device for monitoring a thickness reduction of an inner surface in a heat transfer tube or an inner surface in an evaporation tube.

FIG. 2 is another schematic diagram of a device for monitoring a thickness reduction of an inner surface in a heat transfer tube or an inner surface in an evaporation tube.

As illustrated in FIG. 2, a mirror 35 may be used instead of the prism 33 in the device 10 for monitoring the thickness reduction of the inner surface in the heat transfer tube or the inner surface in the evaporation tube.

According to the embodiment, the laser 32 which is emitted from the laser displacement sensor is guided to the inner surface 11a of the fin tube 11, and is emitted from the front end of the light guiding path in a direction perpendicular to the surface of the fin tube 11. Then, the front end of the light guiding path is controlled by a control unit (not illustrated) so that the reflection surface of the laser 32 is moved by 360° in the peripheral wall surface of the fin tube 11.

Accordingly, the thickness reduction is measured by continuously reading the position of the reflection surface from the tube wall of the fin tube 11 through the laser displacement sensor.

The thickness reduction determining unit determines the current thickness reduction by comparing the measurement data of the laser measurement unit 13 with past data or standard data.

At this time, the position information from the measurement reference point is stored in an information processor of a monitoring operator along with the surface information from the laser displacement sensor and is displayed on a screen.

The thickness reduction determining unit receives plant/inspection portion information, for example, an inspection subject plant name, an inspection subject portion name, design data (a designed outer diameter of a tube, a designed required thickness, a material, and the like), a past inspection history, similar plant data, and the like from a plant information database.

The laser measurement unit 13 moves while sequentially measuring the entire circumference of the inner surface 11a of the fin tube 11 by a laser with the movement of the movement unit 12, so that the thickness reduction is measured.

In this way, according to the embodiment, it is possible to continuously recognize a change in the surface position for the thickness reduction caused by the abrasion of the circulated cooling water as in the inside of the heat exchanger.

Figure 3:
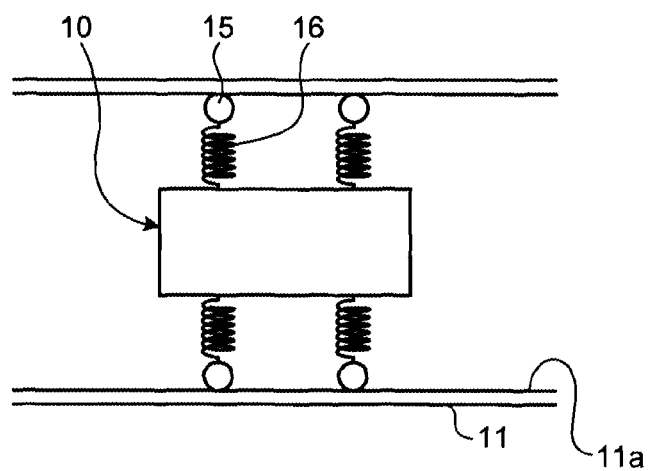
FIG. 3 is another schematic diagram of a device for monitoring a thickness reduction of an inner surface in a heat transfer tube or an inner surface in an evaporation tube.
Figure 4:
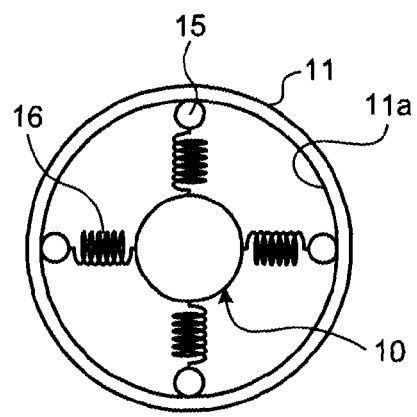
FIG. 4 is a cross-sectional view of FIG. 3.

FIG. 3 is another schematic diagram of a device for monitoring a thickness reduction of an inner surface in a heat transfer tube or an inner surface in an evaporation tube. FIG. 4 is a cross-sectional view thereof.

As illustrated in FIGS. 3 and 4, the moving vehicle wheel 15 is provided through a spring 16 in the device 10 for monitoring the thickness reduction of the inner surface in the heat transfer tube or the inner surface in the evaporation tube, and adheres to the inner surface wall using the spring 16 and the like when the fin tube 11 is curved.

INDUSTRIAL APPLICABILITY

As described above, according to the device for monitoring the thickness reduction of the inner surface in the heat transfer tube or the inner surface in the evaporation tube of the invention, it is possible to recognize a change in the surface position for the thickness reduction caused by the abrasion or the like of the inner surface of the tube.

REFERENCE SIGNS LIST

10 DEVICE FOR MONITORING THICKNESS REDUCTION OF INNER SURFACE IN HEAT TRANSFER TUBE OR INNER SURFACE IN EVAPORATION TUBE
11 FIN TUBE
11a INNER SURFACE
12 MOVEMENT UNIT
13 LASER MEASUREMENT UNIT
14 CABLE

The invention claimed is:

1. A device for monitoring a thickness reduction of an inner surface in a heat transfer tube or an inner surface in an evaporation tube comprising:
   a movement unit adapted to move along the inner surface in the heat transfer tube or the inner surface in the evaporation tube;
   a laser measurement unit provided in the movement unit for measuring the thickness reduction of the inner surface in the heat transfer tube or the inner surface in the evaporation tube by a laser;
   a cable including a light guiding path for introducing a laser into the laser measurement unit and a light deriving path for transmitting reflected light; and
   a thickness reduction determining unit for comparing data of the laser measurement unit with past data or standard data so as to determine the current thickness reduction, wherein
   the laser measurement unit includes:
      a sensor head having a laser displacement sensor; and
      a prism or mirror for shortening a focal distance of the laser,
   the laser measurement unit is configured to guide the laser emitted from the laser displacement sensor, emit the laser in a direction perpendicular to the inner surface, move a reflection surface of the laser by 360° in a peripheral wall surface and continuously read a position of the reflection surface through the laser displacement sensor, so as to measure the thickness reduction.

2. The device according to claim 1, further comprising:
   a stopping unit for temporarily stopping the movement unit.

3. The device according to claim 1,
   wherein the laser measurement unit is configured to measure the thickness reduction while sequentially moving along an inner surface of a fin tube by the movement of the movement unit.

* * * * *